US012801983B2

(12) United States Patent
Suárez Guevara et al.

(10) Patent No.: US 12,801,983 B2
(45) Date of Patent: Nov. 17, 2026

(54) THERMAL PREDICTIVE MODELING OF PHYSICAL ASSETS

(71) Applicant: Schneider Electric USA, Inc., Andover, MA (US)

(72) Inventors: José Carlos Suárez Guevara, San Pedro (MX); Carlos Andrés Ortiz del Angel, Monterrey (MX); Galo Daniel Astudillo Heras, Cuenca (EC); Efrain Gutiérrez, Guadalupe (MX); Daniel Sanchez Perez, Monterrey (MX); Mauricio Diaz, San Nicholás de los Garza (MX)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 894 days.

(21) Appl. No.: 18/090,650

(22) Filed: Dec. 29, 2022

(65) Prior Publication Data

US 2024/0220849 A1 Jul. 4, 2024

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

| | | | | |
|---|---|---|---|---|
| 6,853,920 | B2 * | 2/2005 | Hsiung | G05B 19/41875 702/183 |
| 10,417,614 | B2 * | 9/2019 | Johnson | G05B 13/041 |
| 10,890,904 | B2 * | 1/2021 | Turney | G06Q 10/20 |
| 2017/0286572 | A1 * | 10/2017 | Hershey | B64F 5/60 |
| 2020/0301408 | A1 * | 9/2020 | Elbsat | G05B 23/024 |
| 2020/0356087 | A1 | 11/2020 | Elbsat et al. | |
| 2021/0157312 | A1 | 5/2021 | Cella et al. | |

OTHER PUBLICATIONS

International Search Report and Written Opinion for PCT Patent Application No. PCT/US2023/086246,mailed on May 23, 2024.

* cited by examiner

*Primary Examiner* — Nithya J. Moll
(74) *Attorney, Agent, or Firm* — Quinn IP Law

(57) ABSTRACT

A method is provided that includes receiving time constants and trained regression model(s) determined during a training phase, receiving real-time measured current used by the asset; receiving real-time measured temperatures measured at essential monitoring points; predicting temperature for prediction points in real time by applying the trained regression model(s) using the real-time measured current, previously predicted temperatures for the prediction points, time lapse since the previously predicted temperatures were predicted, and the time constants, wherein the prediction points are selectable to include both prediction points that are the same as and are different from the essential monitoring points; comparing the predicted temperatures for a subset of the prediction points with currently received temperatures for the essential monitoring points that correspond to the subset of the prediction points; correcting the predicted temperatures for the selected prediction points using a result of the comparison; and outputting the predicted temperatures in real time.

20 Claims, 6 Drawing Sheets

THERMAL PREDICTIVE MODELING OF PHYSICAL ASSETS

TECHNICAL FIELD

The present disclosure relates to health monitoring a physical asset, and more particularly, to applying machine learning for thermal predictive modeling of an industrial physical asset.

BACKGROUND

Thermal monitoring systems can identify thermal changes in equipment located in an environment, such as an industrial environment, a vehicle, an appliance, data processing center, or other mechanical environments. Thermal changes can be indicators of potential safety, functional or process problems, and/or the need for maintenance intervention in equipment. Effective thermal monitoring can be used to detect an issue before it develops into a safety risk or affects functionality or productivity of the equipment monitored.

A thermal monitoring system uses sensors placed on thermally conductive surfaces of a physical asset. The sensors are placed in discrete locations that are accessible on the asset for placement of the sensors or within a field of view of the sensors. Locations of the asset that are not physically accessible cannot be monitored by the sensors. Accordingly, real time thermal monitoring using the sensors is limited to monitoring of discrete, physically accessible locations. Potentially critical information related to locations other than the discrete locations accessible to the sensors, including inaccessible locations, is not available to or used by the thermal monitoring system. Accordingly, if a safety alert system, maintenance system, and/or optimization system uses data from the thermal monitoring system to make decisions in real time, the decisions can be made on incomplete data. While conventional methods and systems have generally been considered satisfactory for their intended purpose, there is still a need in the art for a method of real time thermal monitoring of locations other than discrete locations that can be accessed by the sensors, including a continuum of real time thermal monitoring over accessible and/or inaccessible thermally conductive surfaces.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a method for predicting temperatures in an asset. The method includes receiving time constants and at least one trained regression model determined during a training phase that applied machine learning to multi-dimensional simulation points of a simulation simulating an asset and temperatures associated with the respective simulation points, receiving real-time measured current used by the asset, and receiving real-time measured temperatures measured at essential monitoring points. The method further includes predicting temperature for prediction points in real time by applying the at least one trained regression model and using the real-time measured current, previously predicted temperatures for the prediction points, a time lapse since the previously predicted temperatures were predicted, and the time constants, wherein the prediction points are selectable to include both prediction points that are the same as the essential monitoring points and prediction points that are different than the essential monitoring points. The method further includes comparing the predicted temperatures for a subset of the prediction points with currently received temperatures for the essential monitoring points that correspond to the subset of the prediction points, correcting the predicted temperatures for the selected prediction points using a result of the comparison, and outputting the predicted temperatures in real time.

In one or more embodiments, the method can further include updating an augmented reality visualization of the asset in real time using the predicted temperatures.

In one or more embodiments, the method can further include determining whether a difference between the predicted temperatures for the subset of the prediction points and the received temperatures at the corresponding essential monitoring points exceed a threshold and causing an action to be performed that affects the asset in response to a determination that the difference exceeds the threshold.

In one or more embodiments, the method the time constants can be associated with respective clusters of the simulation points and the at least one regression model can be determined from the clusters of the simulation data.

In one or more embodiments, the at least one regression model can include a steady-state regression model that uses polynomial regression and a transient-state regression model that uses exponential regression. The method can include predicting the temperatures at the prediction points by applying the steady-state regression model to predict steady-state temperatures at the prediction points. The method can further include predicting transient-state temperatures at the prediction points by applying the transient-state regression model using the predicted steady-state temperatures at the prediction points, the real time measured current, the previously predicted transient-state temperatures for the prediction points, the time lapse, and the time constants. The predicted temperature for the prediction points in real time can include the predicted transient-state temperatures.

In one or more embodiments, the simulation is can be a digital twin.

In one or more embodiments, the simulation can include two or more steady-state simulations using different simulation parameters, and the method can further include, during the training phase, repeating until a steady-state prediction is determined to be acceptable: extracting, for the two or more steady-state simulations, steady-state simulation points of the simulation points and a temperature associated with each of the steady-state simulation points, applying, for each of the two or more steady-state simulations, a clustering algorithm to the extracted steady-state simulation points and their respective, associated temperatures to form a plurality of steady-state clusters, applying a steady-state regression model to each of the steady-state clusters to represent a relationship between the temperatures associated with the respective steady-state simulation points and the simulation parameters, generating the steady-state prediction by applying the steady-state regression model to selected simulation parameters for predicting steady-state temperatures of the steady-state simulation points at the selected simulation parameters, determining a steady-state difference between the predicted steady-state temperatures of the steady-state simulation points and measured temperatures at a plurality of corresponding monitoring points of the asset, wherein the steady-state prediction is determined to be acceptable when the steady-state difference is below a steady-state threshold, and adjusting for use with a next repetition, if any, the selected simulation parameters to attempt to reduce the steady-state difference.

In one or more embodiments, the simulation can include a transient-state simulation, and the method can include, during the training phase extracting transient-state simulation points of the simulation points and temperatures associated with each of the transient-state simulation points for a plurality of spaced time steps, and applying a clustering algorithm to the extracted transient-state simulation points across the plurality of spaced time steps and their temperatures to form a plurality of transient-state clusters. The method can further include repeating until a transient-state prediction is determined to be acceptable: applying a transient-state regression model to each of the transient-state clusters using the most recent time constant associated with each of the transient-state clusters; generating the transient-state prediction for predicting a latest temperature associated with respective transient-state clusters by applying the transient-state regression model using the steady-state prediction once it is determined to be acceptable, a previous predicted transient-state temperature for the respective transient-state clusters obtained at an earlier simulated time, amount of simulated time elapsed since the earlier simulated time, and the most recent time constant for the corresponding transient-state cluster; determining a transient-state difference between the predicted transient-state temperatures of the transient-state simulation points and the measured temperatures at the plurality of corresponding monitoring points of the asset, wherein the transient-state prediction is determined to be acceptable when the transient-state difference is below a transient-state threshold; and adjusting for use with a next repetition, if any, the time constant to attempt to reduce the transient-state difference.

In one or more embodiments, the method can further include updating an augmented reality visualization of the asset in real time using at least one of the transient-state prediction and the steady-state prediction.

In one or more embodiments, the method can further include obtaining the measured temperatures at the plurality of corresponding monitoring points and continually updating the measured temperatures with measurements obtained at a subset of the monitoring points for use when determining the transient-state difference.

In accordance with another aspect of the disclosure, a method is provided for training at least one model for predicting temperatures in an asset. The method includes repeating until a steady-state prediction is determined to be acceptable: extracting, for two or more steady-state simulations that use different respective simulation parameters, steady-state simulation points and a temperature associated with each of the steady-state simulation points; applying, for each of the two or more steady-state simulations, a clustering algorithm to the extracted steady-state simulation points and their respective, associated temperatures to form a plurality of steady-state clusters; applying a steady-state regression model to each of the steady-state clusters to represent a relationship between the temperatures associated with the respective steady-state simulation points and the simulation parameters; generating the steady-state prediction by applying the steady-state regression model to selected simulation parameters for predicting steady-state temperatures of the steady-state simulation points at the selected simulation parameters; determining a steady-state difference between the predicted steady-state temperatures of the steady-state simulation points and measured temperatures at a plurality of corresponding monitoring points of the asset, wherein the steady-state prediction is determined to be acceptable when the steady-state difference is below a steady-state threshold; and adjusting for use with a next repetition, if any, the selected simulation parameters to attempt to reduce the steady-state difference.

In one or more embodiments, the method can further include the simulation includes a transient-state simulation, and the method can further include during the training phase: extracting, for a plurality of spaced time steps, transient-state simulation points of the simulation points and a temperature associated with each of the transient-state simulation points and applying, across the plurality of spaced time steps, a clustering algorithm to the extracted transient-state simulation points and their associated temperatures to form a plurality of transient-state clusters. The method can further include repeating until a transient-state prediction is determined to be acceptable: applying a transient-state regression model to each of the transient-state clusters using the most recent time constant associated with each of the transient-state clusters; generating the transient-state prediction for predicting a latest temperature associated with respective transient-state clusters by applying the transient-state regression model using the steady-state prediction once it is determined to be acceptable, a previous predicted transient-state temperature for the respective transient-state clusters obtained at an earlier simulated time, amount of simulated time elapsed since the earlier simulated time, and the most recent time constant for the corresponding transient-state cluster; determining a transient-state difference between the predicted transient-state temperatures of the transient-state simulation points and the measured temperatures at the plurality of corresponding monitoring points of the asset, wherein the transient-state prediction is determined to be acceptable when the transient-state difference is below a transient-state threshold; and adjusting for use with a next repetition, if any, the time constant to attempt to reduce the transient-state difference.

In one or more embodiments, the method can further include updating an augmented reality visualization of the asset in real time using at least one of the transient-state prediction and the steady-state prediction.

In accordance with further aspects of the disclosure, one or more computer systems are provided that performs the disclosed methods. In accordance with still further aspects of the disclosure one or more non-transitory computer readable storage mediums and one or more computer programs embedded therein are provided, which when executed by a computer system, cause the computer system to perform the corresponding disclosed method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
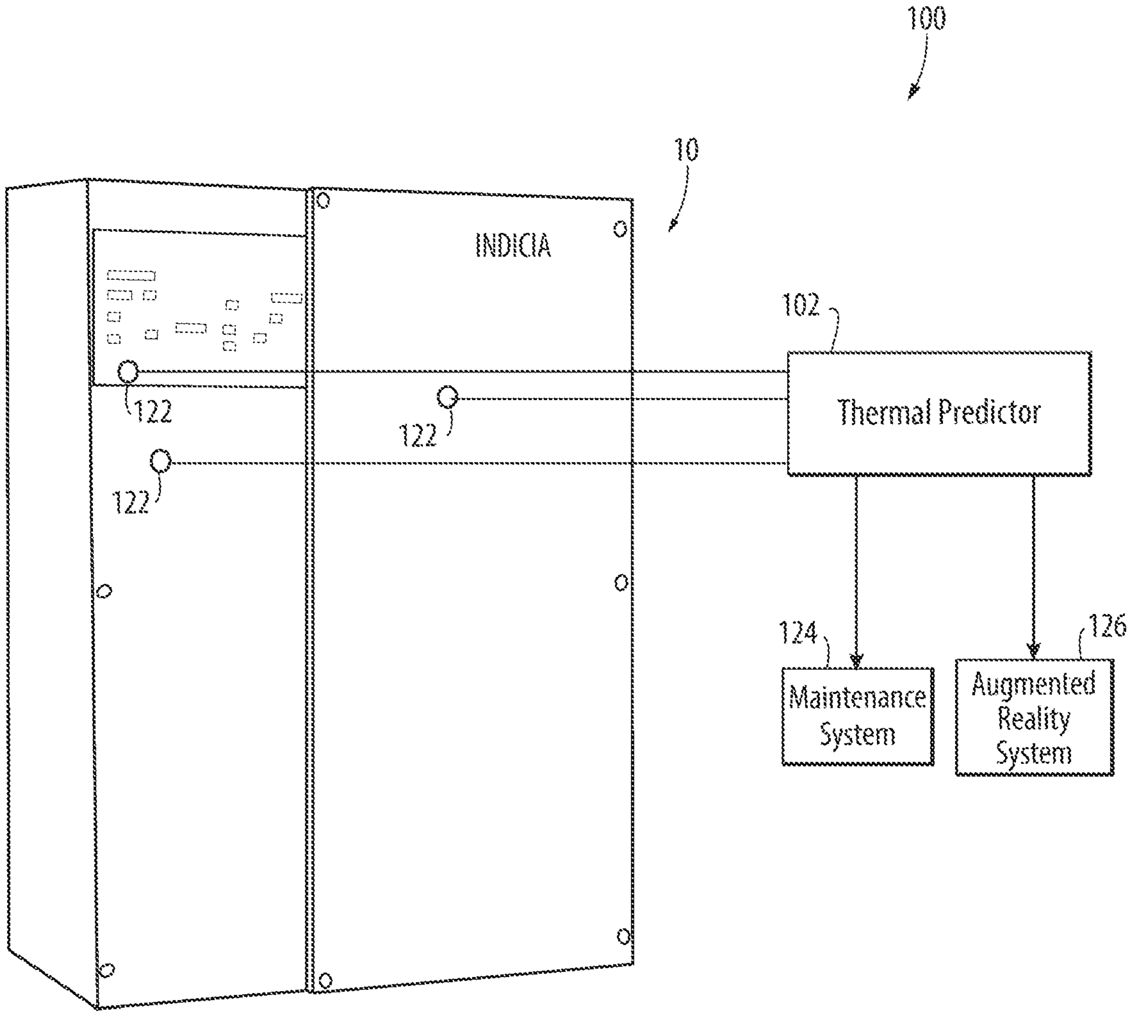
FIG. 1 is a schematic system diagram of a thermal prediction system receiving measurement data from sensors and sending prediction data to a maintenance system and/or an augmented reality system, in accordance with embodiments of the disclosure.

Reference will now be made to the drawings wherein like reference numerals identify similar structural features or aspects of the subject disclosure. For purposes of explanation and illustration, and not limitation, a block diagram of an exemplary embodiment of a thermal monitoring system 100 in accordance with the disclosure is shown in FIG. 1 and is designated generally by reference character 100. Methods associated with predicting thermal conditions of a physical asset using thermal measurements and machine learning, including for inaccessible zones of the physical asset; three-dimensional visualization of the measured and predicted thermal conditions; and maintenance, safety alert, and optimization processing using the predicted and measured thermal conditions with a thermal monitoring system 100 in accordance with the disclosure, or aspects thereof, are provided in FIGS. 2-4, as will be described.

With reference now to FIG. 1, thermal monitoring system 100 includes a thermal predictor 102 that receives measurement data from a plurality of sensors 122 disposed in accessible zones having thermally conductive surfaces of a physical asset 10, such as a physical asset of an industrial system, a vehicle, an appliance, data processing center, or other mechanical environment. Physical asset 10 can be, for example, a piece of industrial equipment, a motor, a conduit, a processing or data storage device, etc.

Sensors 122 can be, for example, infrared imagers or thermometers (or thermocouples)/temperature sensors). Sensors 122 can be placed on thermally conductive surfaces of the physical asset at discrete locations or positioned so that discrete portions of the thermally conductive surfaces are in a field of view of the sensors. Measurement data output by sensors 122 indicates thermal conditions for discrete, accessible locations of the physical asset.

There are zones of physical asset 10 that may be inaccessible to sensing thermal conditions such that sensors cannot be installed or placed on, or have a view of, thermally conductive surfaces in that zone. Examples of inaccessible zones includes, for example, interior portions of physical asset 10, rear areas of physical asset 10 (such as when asset 10 is fixed in a position with its rear area installed against a barrier, such as a wall or insulator or close to movable contacts).

Thermal predictor 102 outputs thermal prediction data that represents the thermal conditions for the accessible and inaccessible zones. The thermal prediction data includes predictions for a continuum of thermal conditions that include a high concentration of data points several magnitudes of order larger than the discrete data points from which actual measurement data is obtained by sensors 122.

A maintenance system 124 receives the thermal prediction data, wherein the thermal prediction data can be used to cause actions to be performed for maintenance of physical asset 10, guarding safety of asset 10 and/or its environment, and/or optimization of operation of asset 10. Decisions about maintenance, safety, and optimization associated with of physical asset 10 can include updating a maintenance schedule, performing an action to cause performance of a repair or replacement, output a control signal to generate an alert and/or control a component associated with the physical asset when a safety concern arises, and/or control a component associated with the physical asset for optimizing operation of the asset.

Augmented reality system 126 receives the thermal prediction data, wherein the thermal prediction data can be used to provide an augmented reality visualization in two or three dimensions of the predicted thermal conditions in the accessible and inaccessible zones, providing a digital twin. In this way, a user can view the predicted thermal conditions in areas of the physical asset that are not accessible or otherwise visible.

Figure 2:
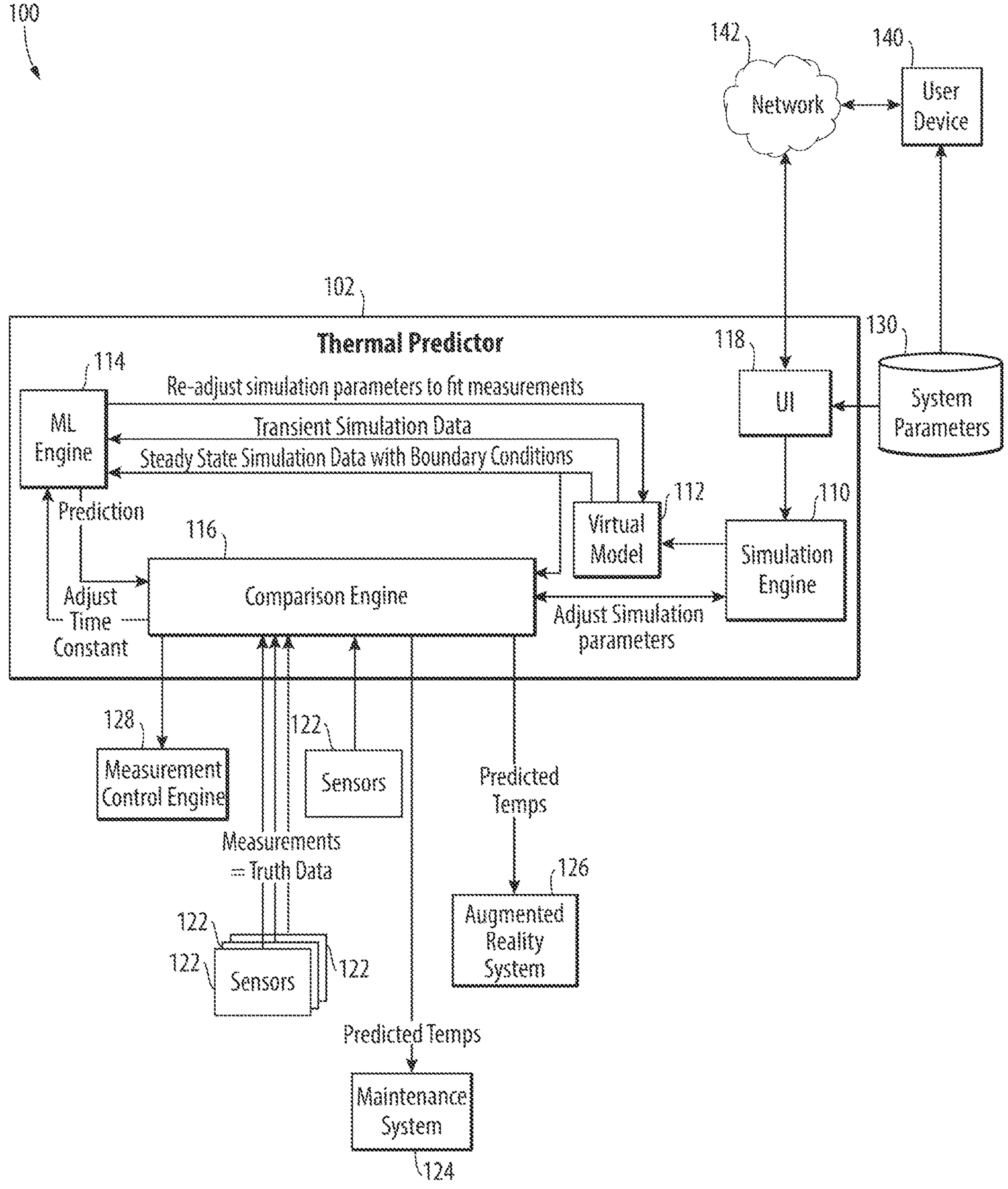
FIG. 2 illustrates a block diagram of an example thermal prediction system, in accordance with an aspect of the disclosure.

With reference to FIG. 2, thermal predictor 102 includes a simulation engine 110 that generates a virtual model 112 based on simulation of the physical asset, a machine learning (ML) engine 114, and a comparison engine 116, and can further include a user interface (UI) 118. Comparison engine 116 compares results of measurement data from sensors 122 with predictions output by ML engine 114 and outputs thermal prediction data and/or alerts to maintenance system 124 and/or augmented reality system 126 (e.g., a digital twin). Simulation engine 110 receives simulation parameters from a collection of simulation parameters 130 and a geometry model of a physical asset. The term “receive” with respect to data is intended to be interpreted broadly, such as to pull data, passively receive data, access data from a remote storage, store data locally and access, read data, receive data via transmission, or otherwise obtain the data.

Machine learning engine 114 applies two phases: a clustering phase and a regression phase. For example, in the clustering phase, a k-means clustering algorithm is applied to sample data to cluster the sample data into n groups having substantially equal variances, minimizing a value known as the inertia or within-cluster sum-of-squares. The k-means algorithm divides the sample data into disjoint clusters, each cluster being described by a mean of the data samples in the cluster. The mean of each cluster is called a cluster centroid; the cluster centroids are computed and may not actually exist in the data samples. In this case, the sample data is formed from multi-dimensional points (meaning points in two dimensions (2D) or three dimensions (3D)) of a steady-state simulation of the asset.

The regression phase can derive a regression model, e.g., a linear regression model, such as ordinary least squares (OLS), that minimizes a sum of squares of differences between an observed dependent variable in in input dataset and an output of a function of an independent variable. Geometrically, this is seen as a sum of squared distances, parallel to an axis of the dependent variable, between each data point in the input dataset and a corresponding point on a regression surface. The smaller the differences, the better the linear regression model fits the data. Without limitation to a particular type of regression, this example type of linear regression model englobes a polynomial regression of the steady state and an exponential regression of the transient state. In this case, the input dataset is clusters that were formed by the clustering phase and the independent variable can be electrical current or another system parameter, such as ambient temperature, electrical/thermal contact resistance, materials, conductors, architecture, natural/forced convection, etc.

The simulation parameters capture system parameters of asset 10. The simulation parameters can include, for example, electrical current, ambient temperature, electrical/thermal contact resistance, materials, conductors, architecture, natural/forced convection, etc. The geometry model can be a two-dimensional (2D) or three-dimensional (3D) computer-aided design (CAD) model or scan.

Simulation engine 110 operates on the geometry model to produce virtual model 112 using cooling simulation software for electronic components. The cooling simulation software can use, for example, a computational fluid dynamics (CFD) solver for electronics thermal management. The cooling simulation software can predict, for example, airflow, temperature (also referred to as a thermal condition), and heat transfer in, for example, integrated circuit (IC) packages, power circuit boards (PCBs), electronic assemblies/enclosures, and power electronics. Examples of cooling simulation software for electronic components include ANSYS Icepak™, Flowtherm™, Comsol™, etc.

The virtual model can be, for example, a digital twin, CFD model, a finite element model, or a CAD model.

Virtual model 112 models a continuum of simulated thermal conditions associated with the physical asset, including for zones accessible to sensors 122 and zones inaccessible to sensors 122. Modelling of the inaccessible zones develops as the virtual model 112 is trained, wherein the training uses comparisons of the prediction data and the measurement data in real time. The continuum of thermal conditions is modeled in real time, wherein the continuum can include a large number of temperature points (e.g., over a million) distributed within a domain of the geometry model at any location within the domain, whereas only one or a few actual thermal measurements are actually sensed by sensors 122. Real time refers to a response time for outputting a result (e.g., while training, updating a model, generating a prediction during operation, etc.) The response time is a function of the model size and available computing power. In one or more embodiments, the response time is in the order of minutes or seconds. In one or more embodiments, the response time is less than one minute. In one or more embodiments, the response time is 3-30 seconds. In one or more embodiments, the response time is 3-10 seconds.

Simulation engine 110 outputs simulation data that is used by virtual model 112 to generate steady-state simulation data using a simulation of at least two different currents while the simulated physical asset is at equilibrium and transient-state simulation data using simulation of the physical asset as it changes over time. The steady-state simulation data provides boundary conditions that can be applied for making predictions.

A digital twin is an executable virtual model designed to accurately reflect a physical asset. The digital twin is a simulation that is entirely based on a physical replica of physical asset being simulated. The digital twin provides more than a virtual model that uses computer-aided design and/or engineering (CAD-CAE). The digital twin can be used for fast transfer of data sets between the physical asset and the digital twin, which enables a user to see how the physical asset is operating in real time. In embodiments, augmented reality can be used with the digital twin. The digital twin uses evolving data, thus providing an accurate description of the physical asset as it changes over time, rather than providing a snapshot of behavior of an object at a specific moment. The digital twin can use timescales over which the physical asset and its behavior is apt to change significantly.

As an overview of the method used, the simulation data output by virtual model 112 is processed with the steady-state simulation data and the transient-state simulation data being processed to separately cluster the data and perform regressions on each of the clustered steady-state simulation data and transient-state simulation data. A prediction is made, in real time, for steady-state temperatures at any current using the regression determined for steady-state. A prediction is made, in real time, for the transient-state temperatures. The prediction of the transient-state temperatures uses a regression determined for transient-state and the predictions for steady-state at the different currents. The regression uses a time constant that defines a rate at which temperature evolves over time. The time constant is updated as a function of a comparison of the predicted transient-state.

As measurement data output from sensors 122 changes, the sensor output is compared to predictions based on the simulation data output by virtual model 112. A result of a comparison of steady-state measurement data and steady-state predictions is used to adjust the simulation parameters for the virtual model 112 to better fit the measurement data output by sensors 122. A result of a comparison of transient-state measurement data and transient-state predictions is used to adjust the time constant, which influences the exponential regressions used for transient-state temperature predictions.

Examples of processes performed by ML engine 114 and comparison engine 116 are now described in greater detail in accordance with one or more embodiments of the disclosure. ML engine 114 processes the simulation data output by virtual model 112, separately processing the steady-state simulation data and the transient-state simulation data. The steady-state simulation data is processed by extracting all points for each of the currents simulated. Each point includes a location that corresponds to the simulated physical asset 10 and a simulated temperature. The extracted points are clustered with points having similar simulated temperatures into categories. The clustering is performed using a clustering algorithm, such as a K-means algorithm, e.g., as implemented by Sklearn.cluster™, an affinity algorithm, a spectral algorithm, an agglomerative algorithm, a meanshift algorithm, etc., without limitation to a particular clustering algorithm or implementation.

The simulated temperatures can be adjusted for different simulation parameters, such as electrical current, etc. for example, the temperatures can be obtained for nominal electrical current and for a small proportion of the nominal current (or by using a different simulation parameter). For example, a polynomial regression can be used to adjust the simulated temperatures for different electrical currents. Some example regression algorithms include multivariable lineal regression, ordinary least squares (OLS), gradient descent, etc., without limitation to a particular regression algorithm or implementation. Based on the adjustments (e.g., using the polynomial regression), a steady-state prediction can be made for temperatures at one or more selected currents. The steady-state predictions for various currents can be used for processing transient-state predictions by ML engine 114, and/or can further be provided to the comparison engine 116. The transient-state simulation data is processed by extracting all points for different time steps, the time steps being separated by equal or unequal time intervals. Each point includes a location that corresponds to the simulated physical asset 10 and a simulated temperature. The extracted points are clustered with points having similar simulated temperatures into categories using the clustering algorithm.

An adjustable time constant that defines evolution of the simulated temperatures as clustered is used by an exponential regression, wherein the exponential regression is a physical model that expresses the transient behavior of temperature. A real-time temperature can be predicted and output as prediction data based on a result of the exponential regression (which uses the time constant as it is adjusted). A steady-state prediction can be obtained for a selected current. The selected currents can include, for example, a nominal current (meaning a maximum current for which the asset is designed for compliance with specifications) and a lower current that is a selected percentage below the nominal current. A transient-state prediction can be obtained, including a last temperature predicted for a selected current, and time elapsed since the last transient-state prediction. The transient-state prediction data for various currents can be provided to the comparison engine 116. The result of the comparison can be used to adjust the time constant.

Comparison engine 116 receives actual measurement data from sensors 122. The measurements can be associated with prompted tests, such as at regular intervals or in response to an event. The actual measurement data can be used as truth data for updating the simulation parameters used by simulation engine 112, thus updating virtual model 112. In particular, comparison engine 116 can receive from multiple sensors 122 actual measurement data in real time (also referred to as real time measurement data) obtained by operating asset 10 at a particular current and predicted steady-state data for the particular current. Comparison engine 116 can compare the measurement data from the tests performed to the predicted steady-state data. The difference represents a prediction error. Alternatively, during runtime, the difference can represent a change in conditions, which may be very different from the simulation parameters.

In one or more embodiments, as shown and described with reference to FIG. 2, when a result of the comparison indicates that there is a difference between the measurement data and the predicted steady-state data that warrants a correction (e.g., the difference (meaning prediction error) exceeds a predetermined threshold (e.g., 5%, without limitation to specific threshold), an adjustment can be made to the simulation parameters that are used for simulating steady-state of asset 10, resulting in updated steady-state simulation data and updated boundary conditions. The adjustment can be manual. The adjusted simulation parameters are, for example, thermal resistance, electrical contact resistance, surface emissivity, airgap modeling, etc. In one or more embodiments, the simulation parameters are fixed throughout a simulation and therefore are not adjusted.

The measurements can also be used as truth data for updating one or more ML parameters applied by ML engine 114. In particular, comparison engine 116 can update the time constant calculated and applied by ML engine 114. Comparison engine 116 can receive actual measurement data obtained for operation of asset 10 at a particular current and predicted transient-state data for the particular current. The actual measurement data can be received from multiple sensors 122 at time intervals for performing tests to obtain measurements.

Comparison engine 116 can compare the measurement data to the predicted transient-state data. In a first correction performed for correcting transient-state simulation data used for simulating transient-state of asset 10, an adjustment is made to the time constant to mitigate a difference between the measurement data and the predicted transient-state data. This first correction is performed using a fixed algorithm that uses a regression model. The fixed algorithm is used regardless of the measurement data or predicted transient-state data values.

In addition, measurements are continually obtained from sensors 122 positioned at essential monitoring points for monitoring integrity of and safety associated with the asset within its environment, e.g., for monitoring integrity of electrical connections (that could loosen over time or be affected by torque or other forces) and/or monitoring for risk of overheating.

Maintenance system 124 receives and monitors the predicted data, which includes predicted steady-state data and predicted transient-state data. Maintenance system 124 can detect anomalies and make determinations, decisions, and recommendations related to maintenance, safety, and optimization associated with asset 10. The determinations and decisions can control processes used for maximizing maintenance, safety, and/or optimization. Augmented reality system 126 receives the predicted data and uses it for providing visualization in two or three dimensions of the predicted thermal conditions in the accessible and inaccessible zones of asset 10. The thermal prediction data represents thermal conditions in the accessible and inaccessible zones. The thermal prediction data includes predictions for a continuum of thermal conditions that is formed of a high concentration of data points, wherein a number of the data points forming the continuum is several magnitudes of order larger than the discrete data points from which actual measurements are obtained by sensors 122.

Maintenance system 124 receives the thermal prediction data provided by virtual model 112 and boundary conditions of the collection of boundary conditions 132 to make decisions about maintenance of the physical asset. The boundary conditions can be updated when the steady-state simulation data is updated. Decisions about the maintenance can include, for example, a decision to one or more of request or modify an order for a maintenance or safety task, which can include to generate or modify a maintenance schedule, a decision to perform a repair or replacement task, output a control signal to generate an alert and/or control a component associated with the physical asset when a safety concern arises, and/or control a component associated with the physical asset for optimizing operation of the asset. Augmented reality system 126 receives the thermal prediction data from virtual model 112 and provides an augmented reality visualization in two or three dimensions of the predicted thermal conditions in the accessible and inaccessible zones. In this way, a user can view the predicted thermal conditions in areas of the physical asset that are not accessible or otherwise visible.

Inputs to simulation engine 110 include boundary conditions from the simulation data, geometry data, information about materials, and simulation parameters. The boundary conditions provided by the simulation data are used to generate the virtual model 112, which is used to generate the prediction data, which is compared to measurement data (truth data) in real time for updating the simulation parameters that are used to generate the virtual model 112. This real time adjustment is performed in transient state, which facilitates training of the virtual model 112 over time. This training of the virtual model 112 enables improvements to modelling the accessible and inaccessible zones of asset 10 over time. In addition, the prediction data is compared to measurement data (truth data) in real time for recalculating the time constant used by the ML engine 114 to generate the transient-state prediction data. This facilitates ML training of ML engine 114 over time for generation of the transient-state simulation data.

UI 118 can receive requests (e.g., queries) from a user device 140, maintenance system 124, and/or augmented reality system 126. The requests can be submitted by a user or can be automatically submitted, such as periodically or in response to a condition.

Figure 4:
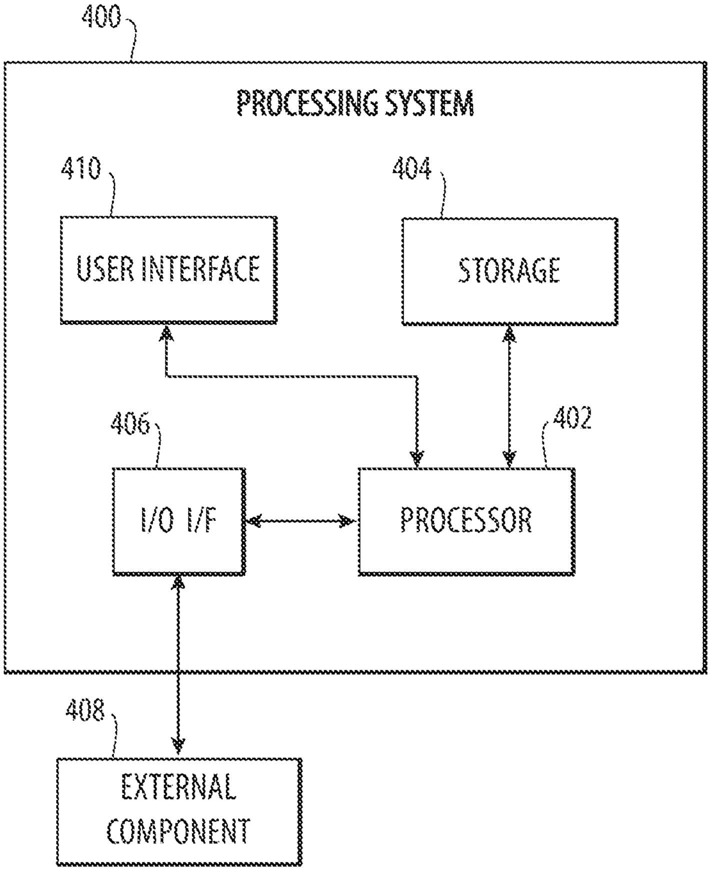
FIG. 4 illustrates an example computing system that could be used to implement the thermal predictor, as shown in FIGS. 1 and 2, in accordance with an embodiment of the disclosure.

With reference to architecture of thermal predictor 102 and its related storage, thermal predictor 102 includes a central processing unit (CPU), random access memory (RAM), and a storage medium, which can be connected through buses and used to further support the processing of the data, as shown and described with respect to FIG. 4. Programmable instructions can be stored in the storage medium and executed by the CPU to cause the CPU to perform operations described herein. Thermal predictor 102 can be implemented as physical or virtual devices. Whether implemented as physical or virtual device(s), Thermal predictor 102 uses a local or remote hardware processing device that executes software instructions, which enables performance of the disclosed functions.

Each of ML engine 114, virtual model 112, and UI 118 can be accessible by thermal predictor 102, and can be integrated with or external from thermal predictor 102. In addition, each of ML engine 114, virtual model 112, and UI 118 can be implemented using software, hardware, and/or firmware.

The external network 142 can include one or more WANs, e.g., the Internet, which may be used to provide communication between user device 140 and thermal predictor 102.

User device 140 can be a computing device such as a server, laptop device, network element (such as routers, switches, and firewalls), embedded computer device that is embedded in other devices, such as appliances, tools, vehicles, or consumer electronics, mobile devices, such as laptops, smartphones, cell phones, and tablets. User device 140 can operate as a client in a client/server exchange, such as to request a service from thermal predictor 102. User device 140 can be included or associated with maintenance system 124 or augmented reality system 126.

Collection of simulation parameters 130 can store data structures used by thermal predictor 102. The data structures can be stored in memory or on persistent storage (such as a file system) that is integrated with thermal predictor 102, or in a database system that is external to thermal predictor 102. For example, collection of simulation parameters 130 can be stored in a storage device that includes computer system readable media in the form of volatile or non/volatile memory or storage media, such as random access memory (RAM), cache memory, a magnetic disk, an optical disk, etc. The storage device can be accessible by thermal predictor 102, and can be integrated with or external from thermal predictor 102.

Communication between thermal predictor 102 and sensors 122, maintenance system 124, augmented reality system 126, collection of simulation parameters 130, and/or user device 140 can be via wired and/or wireless communication links and/or can be via a network 142, which can be a local area network (LAN), protected network, wide area network (WAN), such as the Internet.

Figure 3A:
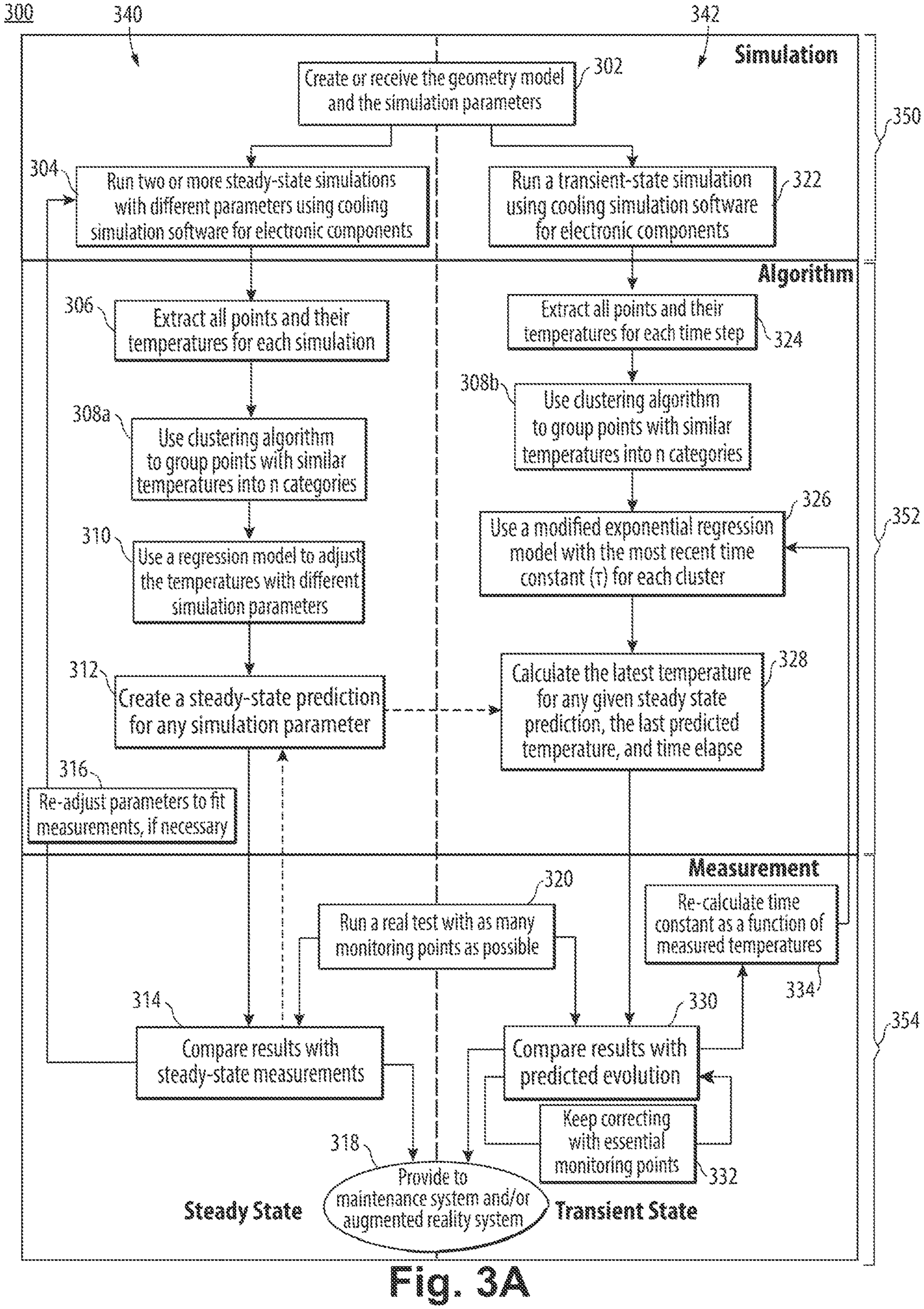
FIG. 3A illustrates a flowchart of an example method performed for training a thermal predictor of the thermal prediction system, in accordance with embodiments of the disclosure.
Figure 3B:
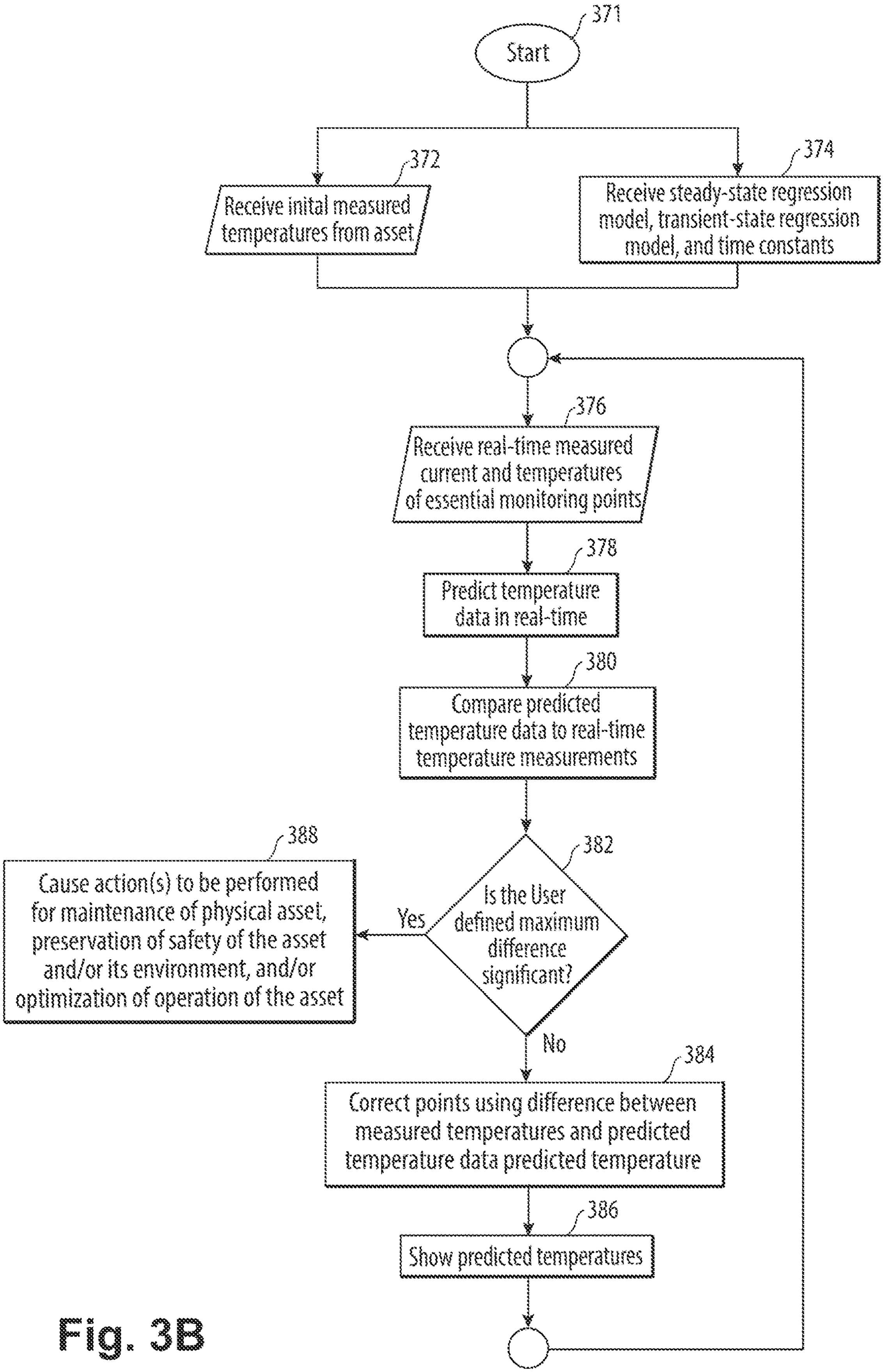
FIG. 3B illustrates a flowchart of an example method performed by the thermal predictor of FIG. 3A during operation of an asset, in accordance with embodiments of the disclosure.
Figure 3C:
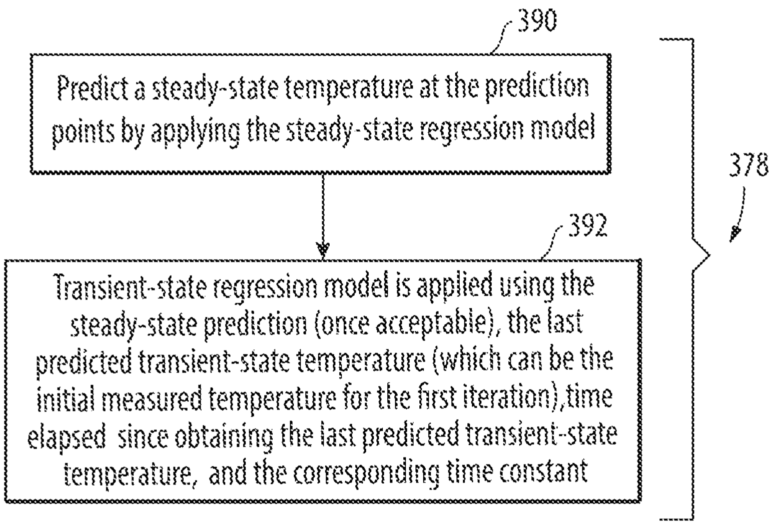
FIG. 3C illustrates a flowchart of an example method of performing an operation of predicting temperature data shown in FIG. 3B, in accordance with embodiments of the disclosure.

FIGS. 3A-3C show exemplary and non-limiting flowcharts illustrating methods related to thermal predictive modeling of an industrial physical asset, in accordance with certain illustrated embodiments. Before turning to the description of FIGS. 3A-3C, it is noted that the flowcharts in FIGS. 3A-3C show examples in which operational blocks are carried out in a particular order, as indicated by the lines connecting the blocks, but the various blocks shown in these flowcharts can be performed in a different order, or in a different combination or sub-combination. It should be appreciated that in some embodiments some of the blocks described below may be combined into a single block. In some embodiments, one or more additional blocks may be included. In some embodiments, one or more of the blocks can be omitted.

With reference to FIG. 3A, flowchart 300 shows an example method of a training phase for training a thermal predictor, such as predictor 102 shown in FIG. 2, to perform thermal predictive modeling of an industrial physical asset. Flowchart 300 includes a steady-state side 340 that handles operations for generating a steady-state regression model and a transient-state side 342 that handles operations for generating a transient-state regression model.

Blocks 302, 304, and 322 are performed by a simulation portion 350 of the thermal predictor. Blocks 306, 308, 310, 312, 316, 324, 326, and 328 are performed by an ML portion 352 of the thermal predictor. Blocks 314, 318, 320, and 330, 332, and 334 are performed by a comparison and measurement portion 354 of a thermal monitoring system. Comparisons are performed by a comparison engine, such as comparison engine 116 shown in FIG. 2. Measurements are performed by sensors, such as sensors 122 shown in FIG. 2. In FIG. 3A, outputs of blocks 304 and 322 each represent a portion of virtual model 112.

At block 302, a geometry model of a physical asset and initial simulation parameters for simulating the physical asset are generated or received. The geometry model can be generated by a CAD application operating on a user input file that includes data about the physical asset. The simulation parameters can be input by a user via a user interface. The simulation parameters are inputs to a simulation engine (such as simulation 110 shown in FIG. 2) that can be selected to be any simulation parameters that are realistic for the physical asset.

Blocks 304, 306, 308*a*, 310, 312, 314, and 316 form a steady-state loop for processing steady-state simulations, with block 320 providing measurements from a large quantity of test monitoring points that are used by both the steady-state loop and a transient-state loop. The initial simulation parameters are used the first time the steady-state loop is performed for generating a first steady-state simulation. The simulation parameters are adjusted at block 316 for the subsequent iterations of the steady-state loop. The adjustment at block 316 can be performed manually. A different steady-state simulation is generated for each iteration of the steady-state loop.

Focusing on processing of the steady-state simulation, at block 304, a steady-state simulation program is executed that operates on the geometry model using cooling simulation software and the simulation parameters to produce the virtual model in the steady state. The virtual model is an executable software model that provides a steady-state simulation of the asset. The virtual model for the steady state defines multi-dimensional (2D or 3D) steady-state simulation points and their associated temperatures, wherein the steady-state simulation points correspond to a 2D or 3D representation of the asset when operating at steady state. The steady-state simulation points can be numerous, e.g., thousands or millions of points.

Block 304 is updated as shown by the arrow from blocks 314 and 316, and the updated output of block 304 provides a steady-state portion of the virtual model. A steady-state simulation is provided for each of two or more different sets of simulation parameters of the asset, e.g., a nominal current and one or more lower currents that are each a selected respective percentage below the nominal current, ambient temperature, etc. Still focusing on processing of the steady-state simulation, at block 306, for each steady-state simulation, the steady-state simulation points (e.g., all of the steady-state simulation points, without restriction thereto) are extracted with their associated temperatures. In certain scenarios, millions of points can be extracted. At block 308A, a clustering algorithm is applied to group all of the points extracted at block 306 from all of the iterations performed so far into steady-state clusters so that points having similar temperatures are clustered together. The clustering algorithm can be, for example, a K-means clustering algorithm, such as provided at sklearn.cluster. Some extracted points that are outliers or non-relevant to the simulation may not be assigned to a steady-state cluster.

At block 310, a polynomial regression is applied to each of the steady-state clusters. In this way, the steady-state regression model is developed that determines, for the simulated temperatures associated with the respective steady-state simulation points, how the simulated temperatures relate to the simulation parameters used for the iterations of steady-state simulations using respective different simulation parameters.

At block 312, a steady-state prediction is made using the steady-state regression model to predict temperatures for any selected set of simulation parameters that define a simulation point. Block 312 uses the steady-state regression model and interpolation and/or extrapolation to predict temperatures while training a virtual model, such as virtual model 112 of thermal predictor 102. For example, the set of simulation parameters can be selected to be the same as a set of real parameters that define a test monitoring point used at block 320 when performing a real test. A temperature prediction, referred to as steady-state prediction data, can be made for many respective simulated points. The simulated points can be disposed at the same and different locations from the test monitoring points used at block 320.

FIG. 3A shows an arrow from block 312 to block 328 for providing the steady-state temperature prediction to block 328. In one or more embodiments, the provision of the steady-state temperature prediction to block 328 is performed after block 314 determines that results of the comparison are satisfactory, e.g., below a predetermined threshold. This is indicated by a dashed arrow from block 314 to block 312 and a dashed arrow from block 312 to block 328. The disclosure is not limited to a particular criteria for permitting transfer of the steady-state temperature prediction to block 328, as other criteria can alternatively be used.

At block 320, a real test is performed to obtain measurement data from sensors 122 disposed at a large quantity of test monitoring points. The test monitoring points used can include as many test monitoring points as can be available. This large quantity of test monitoring points is used in particular for the learning phase. The test performed at block 320 can be performed one time only or as needed. Block 320 is not included in the loops.

At block 314, the real-time measurement data is compared to the steady-state prediction data. When a test monitoring point has a corresponding simulated point, the comparison can determine a difference between the predicted temperature for the simulated point and measured temperature for the monitoring point. When a monitoring point does not have a corresponding simulated point, the comparison can determine a difference between an extrapolated predicted temperature for an interpolated simulated point and measured temperature for the monitoring point. It is determined whether the differences (also referred to as steady-state prediction error) between the real-time measurement data for the test monitoring points and the steady-state prediction data exceeds a predetermined steady-state threshold.

At block 316, the simulation parameters are adjusted to reduce the steady-state prediction error. Adjustments to the simulation parameters can be made manually using a user interface, such as UI 118 shown in FIG. 2. A next iteration of the steady-state loop is executed using the adjusted simulation parameters, beginning again at block 304. For each iteration of the steady-state loop, the ML engine reruns both of its phases, including rerunning both clustering and the steady-state regression model. The steady-state loop can be repeated until the steady-state prediction error is below the steady-state threshold. In this way, the steady-state simulation generated for the second iteration of the steady-state loop provides updated steady-state simulation data and updated boundary conditions as a function of real-time measurements.

In addition, when the steady-state prediction error is sufficiently low (e.g., steady-state prediction error does not exceed the steady-state threshold), at block 318 the training phase ends and the steady-state regression model trained at block 310 and the transient-state regression model trained at block 326 are ready to use for performing predictions during operation as shown in FIG. 3B. In addition, at block 318, the steady-state prediction data is provided to a maintenance system and/or augmented reality system, such as maintenance system 124 and augmented reality system 126 shown in FIG. 2.

Maintenance system 124 can use the steady-state prediction data to generate a maintenance schedule for the physical asset, which can include, for example, one or more of detecting anomalies, making determinations and outputting recommendations (e.g., instructions and/or alerts) related to maintenance, safety, and optimization associated with the physical asset.

Augmented reality system 126 can use the steady-state prediction data to provide visualization in two or three dimensions of the predicted thermal conditions in the accessible and inaccessible zones of the physical asset. In one or more embodiments, provision of the steady-state prediction data to maintenance system 124 and augmented reality system 126 as described is the final use of the steady-state prediction data, after which the steady-state model is used for making predictions going forward.

Focusing now on blocks 322, 324, 326, 328, 330, 332, and 334 for processing of the transient-state simulation, the transient-state simulation processing can be performed in parallel or in series with processing of the steady-state simulation. There are two loops in transient-state side 342. The first loop is the transient-state loop that returns at block 334, and the second loop is a small test loop that returns at block 332. The small test loop corresponds to each cycle in real time during a real test. The transient-state loop corresponds to iterations between real tests.

An initial time constant is used the first time the transient-state loop is performed for each time step of a plurality of spaced time steps and for each cluster of each time step. The time constant is adjusted at block 334 for each iteration of the transient-state loop. At block 322, a transient-state simulation program is executed that operates on the geometry model using cooling simulation software to produce the virtual model for the transient state. When the transient-state simulation program is executed, the transient portion of the virtual model output at block 322 provides a simulation of the asset at transient state that is dynamic over time. The time can be divided into time steps. The virtual model for the transient state defines multi-dimensional (2D or 3D) transient-state simulation points and their associated temperatures, wherein the transient-state simulation points correspond to a 2D or 3D representation of the asset when operating at transient state. The transient-state simulation points can be numerous, e.g., thousands or millions of points.

At block 324, all transient-state simulation points of the transient-state simulation (e.g., all of the transient-state simulation points, without restriction thereto) are extracted with their associated temperatures for each time step. At block 308B, the clustering algorithm (which is the same as the clustering algorithm used at block 308A) is applied to group all of the transient-state simulation points across the time steps (meaning clustering for multiple or all of the time steps, without restriction thereto) that have similar temperatures, resulting in one or more transient clusters. Some extracted points that are outliers or non-relevant to the simulation are not assigned to a transient-state cluster. An initial time constant is inherently associated with each transient-state cluster and can be determined for each transient-state cluster using the transient-state regression model.

Beginning the transient-state loop, at block 326, the transient-state regression is applied to each of the one or more transient-state clusters using the most recent time constant for each transient-state cluster. Initial time constants are used for the first iteration of the transient-state loop, and adjusted time constants (which are adjusted at block 334) are used for the respective transient-state clusters for subsequent iterations. The transient-state regression can use an exponential regression having either a single term or a sum of exponentials.

At block 328, once the steady-state prediction is provided (as indicated by the dotted arrow from block 312 to block 328, e.g., after being determined to meet predetermined criteria at block 314), a new transient-state temperature is predicted for the respective simulation points. The prediction process applies the transient-state regression model in real time (meaning it is predicted to be the actual temperature at that time, as simulated). The predicted transient-state temperature per cluster is output as transient-state prediction data. The real time transient-state temperature is predicted as a function of the steady-state temperature prediction determined at block 312 at the simulated time, a previous (this can be the most recent, but is not limited thereto) predicted transient-state temperature for the associated cluster (which can be a default value, such as ambient temperature, for the first iteration) obtained at an earlier simulated time, an amount of simulated time elapsed since the earlier simulated time, and the time constant for the corresponding transient-state cluster, based on the most recent adjustment of the relevant time constant. The prediction can apply Newton's Law of cooling or a variation thereof shown in Equation (1), below. It is noted that the disclosure is not limited to Equation (1), and other equations that apply Newton's Law of cooling or a variation thereof can be used.

$$T_{(i+1)} = T_{amb} + (T_{ss} - T_i)e^{\tau t} \quad \text{Equation (1)}$$

where $T_{i+1}$ is the predicted temperature for a transient-state cluster, $T_i$ is the last temperature for the transient-state cluster, $T_{amb}$ is the ambient temperature, $T_{ss}$ is the steady-state temperature, t is the time elapsed since $T_i$ was obtained, and $\tau$ is the time constant for the transient-state cluster. In the example shown, a sum of exponentials is used, providing multiple time constants.

Block 320 can be performed one time using sensors 122 disposed at as many test monitoring points as possible during the training phase while both steady-state and transient-state simulations are performed, to obtain temperature measurement data from sensors 122. At block 330, evolution of the measurement data is compared to the time constants associated with the respective transient-state clusters. If the difference in evolution between the measurement data and the corresponding time constants exceeds a predetermined transient-state threshold for the comparison, then the method continues at block 334 for recalculation of the time constant as a function of evolution of the measurement data, followed by iteration of a the transient-state loop, beginning at block 326, using the adjusted time constant. The adjustment of the time constant can be determined using a formula that is based on Newton's law of cooling. If the transient-state prediction error is below the predetermine transient-state threshold, then the method continues at block 318.

An inner loop including blocks 330 and 332 is continually performed until execution of block 318. At block 332, measurement data is received from the sensors 122 disposed at essential monitoring points. The essential monitoring points are much fewer than the test monitoring points used at block 320. For example, in one or more embodiments at block 332 1 or two essential monitoring points are used per power phase (e.g., three power phases, but without limitation to a specific number of power phases), as compared to about 5-10 monitoring points that are used at block 320. The number of monitoring points is provided as an example and is not intended to limit the disclosure to a particular number of monitoring points at blocks 220 or 332. Thus, each time block 330 is performed, the comparison uses updated measurements for the essential monitoring points as most recently provided at block 332. Block 332 uses a formula to correct the predicted temperature. The formula can use any error calculation, such as a calculation of percent error.

At block 334, results of the comparison performed at block 330 are used to adjust the time constant at block 326. The adjusted time constant determined at block 334 is provided to block 326 and the transient-state loop is repeated, such as until the transient-state prediction error determined at block 330 is sufficiently low (e.g., does not exceed the transient-state threshold), which indicates that the exponential regression model is sufficiently trained. Once the regression model trained at block 310 and the exponential regression model trained at block 326 are sufficiently trained, they are available for use to make real-time temperature predictions during operation of the asset.

With reference to FIG. 3B, flowchart 370 shows an example method of real-time processing the steady-state and transient-state prediction data during operation an operation phase in which an asset, such as asset 10 shown in FIG. 1, is being operated. The method can be performed by a maintenance and/or augmented reality system, such as maintenance system 124 and/or augmented reality system 126 shown in FIG. 1. The method starts at blocks 372 and 374. At block 372, initial measured temperatures are received from the asset. At block 374, at least one regression model (for example the steady-state regression model trained at block 310 and the transient-state regression model trained at block 326) are received, as well as the time constants for the respective clusters adjusted at block 326.

Block 376 begins a prediction loop that includes blocks 376, 378, 380, 382, 384, and 386. The prediction loop can be performed iteratively.

At block 376, real-time measured current per power phase and temperatures are received from sensors disposed at essential monitoring points. At block 378, temperature data is predicted in real time, e.g., for selectable prediction points, wherein the prediction points can be selected to include prediction points that are located at locations that are both the same as locations of the essential monitoring points and locations that are different than locations of the essential monitoring points, e.g., including locations of the asset that are not accessible. In other words, the prediction points can be selected to include both prediction points that are the same as the essential monitoring points and prediction points that are different than the essential monitoring points.

The prediction of temperatures for the prediction points is performed by applying the at least one trained regression model using a current measurement received in real time, previously predicted temperatures for the prediction points (using the initial measured temperatures for the first performance of block 378), the amount of time elapsed since the previously predicted temperatures were predicted, and the time constants received at block 374. As illustrated in example Equation (1), the time constants are used as an exponential term for calculating the predicted temperatures.

At block 380 the predicted temperatures for a subset of the prediction points are compared to the real-time temperatures measurements for the corresponding essential monitoring points received at block 376. Block 380 mirrors block 330 of the training phase. At block 382, a determination is made whether the difference is significant between the predicted and measured temperature data compared at block 380.

If the determination at block 382 is that the difference is significant, the method continues at block 388. This significant difference can indicate that the asset is not operating as expected and an action needs to be taken to avert a problem or discover the cause of the significant difference. At block 388, one or more actions are caused to be performed for maintenance of physical asset, preservation of safety of the asset and/or its environment, and/or for optimization of operation of the asset. These actions can be physical actions and/or computational actions that affect the asset itself. In one or more embodiments, the action affects the asset's operation or an action performed to the asset. In one or more embodiments, the action causes performance of a repair or replacement operation. In one or more embodiments, the action updates a maintenance schedule for the asset, thus causing performance of a repair or a replacement operation. In one or more embodiments, the action includes outputting a control signal to control a component associated with the physical asset, e.g., to disable a component for addressing a safety concern, or for optimizing operation of the asset. In one or more embodiments, the action causes generation of an alert, e.g., when a safety concern arises.

If the determination at block 382 is that the difference is not significant, the method continues at block 384. At block 384, corrections are made to the predicted temperatures of the prediction points using a result of the comparison performed at block 380. The result of the comparison can include, for example a difference between the predicted temperatures for prediction points and the received temperatures for the corresponding essential monitoring points. Accordingly, correcting a predicted temperature based on a result of the comparison performed at block 380 includes correcting the predicted temperature for a prediction point based on the difference between the temperature predicted for the prediction point and the temperature received for the corresponding essential monitoring point. For example, the difference can be used as a form of calibration. Block 384 uses a formula to correct the predicted temperature. The formula can use any error calculation, such as a calculation of percent error. Block 384 mirrors block 332 of the training phase.

At block 386 the predicted temperatures are displayed. The predicted temperatures are provided with a timestamp for a next iteration of the prediction loop for use by block 378 for a prediction during the next iteration.

With reference to FIG. 3C, a flowchart showing an example method of performing block 278 of FIG. 3B is shown. The at least one regression model includes a steady-state regression model that uses polynomial regression and a transient-state regression model that uses exponential regression. The method starts at blocks 390, in which a steady-state temperature prediction is performed using the steady-state regression model to predict steady-state temperatures at the prediction points. Block 390 mirrors block 312 of the training phase. The method continues at block 392, in which the transient-state regression model is applied using the steady-state prediction (once acceptable), the last predicted transient-state temperature (which can be the initial measured temperature for the first iteration), time elapsed since predicting the last predicted transient-state temperature, and the corresponding time constant. The predicted temperature for the prediction points provided by block 378 in real time includes the predicted transient-state temperatures. Block 392 mirrors block 328 of the training phase.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

Embodiments of the thermal predictor 102 shown in FIG. 1 may be implemented or executed by one or more computer systems. For example, thermal predictor 102 can be implemented using a computer system such as example computer system 400 illustrated in FIG. 4. In various embodiments, computer system 400 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 400 is only one example of a suitable system and is not intended to suggest any limitation as to the scope of use or functionality of embodiments of the disclosure described herein. Regardless, computer system 400 is capable of being implemented and/or performing any of the functionality set forth hereinabove.

Computer system 400 may be described in the general context of computer system-executable instructions, such as program modules, being executed by a computer system. Generally, program modules may include routines, programs, objects, components, logic, data structures, and so on that perform particular tasks or implement particular abstract data types. Computer system 400 may be practiced in distributed data processing environments where tasks are performed by remote processing devices that are linked through a communications network. In a distributed data processing environment, program modules may be located in both local and remote computer system storage media including memory storage devices.

Computer system 400 is shown in the form of a general-purpose computing device. Computer system 400 includes one or more processors 402, storage 404, an input/output (I/O) interface (I/F) 406 that can communicate with an internal component, such as a user interface 410, and optionally an external component 408.

Thermal predictor 102 can be configured to handle large amounts of data. Computer system(s) used to implement thermal predictor 102 can be implemented, for example, using multiprocessors, a big data architecture, or one or more cloud-based computer systems.

The processor(s) 402 can include, for example, a single core or multicore processor, a programmable logic device (PLD), microprocessor, DSP, a microcontroller, an FPGA, an ASIC, and/or other discrete or integrated logic circuitry having similar processing capabilities.

The processor(s) 402 and the storage 404 can be included in components provided in the FPGA, ASIC, microcontroller, or microprocessor, for example. Storage 404 can include, for example, volatile and non-volatile memory for storing data temporarily or long term, and for storing programmable instructions executable by the processor(s) 402. Storage 404 can be a removable (e.g., portable) memory for storage of program instructions. I/O I/F 406 can include an interface and/or conductors to couple to the one or more internal components and/or external components 408.

The program instructions can include program modules for ML engine 114, virtual model 112, and UI 118 shown in FIG. 1, by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of embodiments of the disclosure as described herein.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process. The instructions when executed on the computer or other programmable apparatus provide processes for implementing the disclosed functions/acts, including those specified in the block diagram block or blocks.

Embodiments of the processing components of thermal predictor 102 may be implemented or executed by one or more computer systems 400. Each computer system 400 or multiple instances thereof can be included within thermal monitoring system 100. The computer system 400 can be provided as an embedded device or include an embedded device. Portions of the computer system 400 can be provided externally, such by way of a virtual, centralized, and/or cloud-based computer.

Computer system 400 is only one example of a suitable system and is not intended to suggest any limitation as to the scope of use or functionality of embodiments of the disclosure described herein. Regardless, computer system 400 is capable of being implemented and/or performing any of the functionality set forth hereinabove.

Computer system 400 may be described in the general context of computer system-executable instructions, such as program modules, being executed by a computer system. Generally, program modules may include routines, programs, objects, components, logic, data structures, and so on that perform particular tasks or implement particular abstract data types.

The terms "comprises" or "comprising" are to be interpreted as specifying the presence of the stated features, integers, operations or components, but not precluding the presence of one or more other features, integers, operations or components or groups thereof.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.).***

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A method, comprising:

training, during a training phase, at least one regression model by applying machine learning to multi-dimensional simulation points of a simulation simulating an asset and temperatures associated with the respective simulation points;

repeating, during the training phase, a steady-state loop process until a steady-state prediction is determined to be acceptable, wherein the steady-state loop process comprises extracting, for the simulation, steady-state simulation points of the simulation points and a temperature associated with each of the steady-state simulation points;

receiving time constants and the at least one trained-regression model determined during the training phase;

receiving real-time measured current used by the asset;

receiving real-time measured temperatures measured via sensors at essential monitoring points of the asset, wherein the essential monitoring points include thermally conductive surfaces of the asset on which the sensors are and/or locations at which discrete portions of the thermally conductive surfaces are within a field of view of the sensors;

predicting temperature for prediction points of the asset in real time to generate predicted temperatures by applying the at least one regression model and using the real-time measured current, previously predicted temperatures for the prediction points, a time lapse since the previously predicted temperatures were predicted, and the time constants, wherein the prediction points are selectable to include selected prediction points having same prediction points as the essential monitoring points and different prediction points than the essential monitoring points, wherein the same prediction points correspond to accessible zones of the asset that are accessible to the sensors, and wherein the different prediction points correspond to inaccessible zones of the asset that are inaccessible to the sensors;

performing a comparison of the predicted temperatures for a subset of the prediction points with currently received temperatures for the essential monitoring points that correspond to the subset of the prediction points;

correcting the predicted temperatures for the selected prediction points to generate corrected predicted temperatures using a result of the comparison; and outputting the corrected predicted temperatures in real time, wherein the corrected predicted temperatures represent thermal conditions in both the accessible zones of the asset and the inaccessible zones of the asset.

2. The method of claim 1, further comprising updating an augmented reality visualization of the asset in real time using the corrected predicted temperatures.

3. The method of claim 1, further comprising:

determining whether a difference between the predicted temperatures for the subset of the prediction points and the currently received temperatures at the corresponding essential monitoring points exceeds a threshold; and triggering an action to affect the asset in response to determining that the difference exceeds the threshold.

4. The method of claim 1, wherein the time constants are associated with respective clusters of the simulation points, wherein each of the simulation points includes a location of the asset that is simulated and a simulated temperature at the location of the asset, and wherein the at least one regression model is determined from the respective clusters of the simulation data.

5. The method of claim 1, wherein the at least one regression model includes a steady-state regression model that uses polynomial regression and a transient-state regression model that uses exponential regression, and wherein predicting the temperature for the prediction points comprises:

predicting steady-state temperatures at the prediction points to generate predicted steady-state temperatures by applying the steady-state regression model; and predicting transient-state temperatures at the prediction points to generate predicted transient-state temperatures by applying the transient-state regression model using the predicted steady-state temperatures at the prediction points, the real time measured current, previously predicted transient-state temperatures for the prediction points, the time lapse, and the time constants, wherein the predicted temperature for the prediction points in real time includes the predicted transient-state temperatures.

6. The method of claim 1, wherein the simulation is a digital twin based on a physical replica of the asset simulated by the simulation, and wherein the digital twin employs evolving data associated with the asset to represent real-time changes to the asset over time.

7. The method of claim 1, wherein the simulation includes two or more steady-state simulations using different simulation parameters, and wherein the steady-state loop process further comprises:

extracting, for the two or more steady-state simulations, the steady-state simulation points of the simulation points and the temperature associated with each of the steady-state simulation points;

applying, for each of the two or more steady-state simulations, a clustering algorithm to the steady-state simulation points and their respective associated temperatures to form a plurality of steady-state clusters;

applying a steady-state regression model to each of the steady-state clusters to represent a relationship between the temperatures associated with the respective steady-state simulation points and the simulation parameters;

generating the steady-state prediction by applying the steady-state regression model to selected simulation parameters for predicting steady-state temperatures of the steady-state simulation points at the selected simulation parameters;

determining a steady-state difference between the predicted steady-state temperatures of the steady-state simulation points and measured temperatures at a plurality of corresponding monitoring points of the asset, wherein the steady-state prediction is determined to be acceptable when the steady-state difference is below a steady-state threshold; and adjusting for use with a next repetition, if any, the selected simulation parameters to attempt to reduce the steady-state difference.

8. The method of claim 7, wherein the simulation includes a transient-state simulation, and wherein the method further comprises, during the training phase:

extracting transient-state simulation points of the simulation points and temperatures associated with each of the transient-state simulation points for a plurality of spaced time steps;

applying the clustering algorithm to the transient-state simulation points across the plurality of spaced time steps and their temperatures to form a plurality of transient-state clusters; and repeating a transient-state loop process until a transient-state prediction is determined to be acceptable, wherein the transient-state loop process comprises:

applying a transient-state regression model to each of the transient-state clusters using a most recent time constant associated with each of the transient-state clusters;

generating the transient-state prediction for predicting a latest temperature associated with respective transient-state clusters by applying the transient-state regression model, wherein the transient-state regression model is applied using; the steady-state prediction once it is determined to be acceptable, a previously predicted transient-state temperature for the respective transient-state clusters obtained at an earlier simulated time, an amount of simulated time elapsed since the earlier simulated time, and the most recent time constant for the corresponding transient-state cluster;

determining a transient-state difference between the predicted transient-state temperatures of the transient-state simulation points and the measured temperatures at the plurality of corresponding monitoring points of the asset, wherein the transient-state prediction is determined to be acceptable when the transient-state difference is below a transient-state threshold; and adjusting for use with a next repetition, if any, the time constant to attempt to reduce the transient-state difference.

9. The method of claim 8, further comprising updating an augmented reality visualization of the asset in real time using at least one of the transient-state prediction or the steady-state prediction.

10. The method of claim 8, further comprising:

obtaining the measured temperatures at the plurality of corresponding monitoring points; and continually updating the measured temperatures with measurements obtained at a subset of the monitoring points for use when determining the transient-state difference.

11. A thermal monitoring system for predicting temperatures, the thermal monitoring system comprising:

a memory configured to store instructions; and at least one processing device in communication with the memory, wherein the at least one processing device upon execution of the instructions is configured to:

train, during a training phase, at least one regression model by applying machine learning to multi-dimensional simulation points of a simulation simulating an asset and temperatures associated with the respective simulation points;

repeat, during the training phase, a steady-state loop process until a steady-state prediction is determined to be acceptable, wherein the steady-state loop process comprises extracting, for the simulation, steady-state simulation points of the simulation points and a temperature associated with each of the steady-state simulation points;

receive time constants and the at least one regression model determined during the training phase;

receive real-time measured current used by the asset;

receive real-time measured temperatures measured via sensors at essential monitoring points of the asset, wherein the essential monitoring points include thermally conductive surfaces of the asset on which the sensors are and/or locations at which discrete portions of the thermally conductive surfaces are within a field of view of the sensors;

predict temperature for prediction points of the asset in real time to generate predicted temperatures by applying the at least one regression model and using the real-time measured current, previously predicted temperatures for the prediction points, a time lapse since the previously predicted temperatures were predicted, and the time constants, wherein the prediction points are selectable to include selected predicted points having same prediction points as the essential monitoring points and different prediction points than the essential monitoring points, wherein the same prediction points correspond to accessible zones of the asset that are accessible to the sensors, and wherein the different prediction points correspond to inaccessible zones of the asset that are inaccessible to the sensors;

perform a comparison of the predicted temperatures for a subset of the prediction points with currently received temperatures for the essential monitoring points that correspond to the subset of the prediction points;

correct the predicted temperatures for the selected prediction points to generate corrected predicted temperatures using a result of the comparison; and output the corrected predicted temperatures in real time, wherein the corrected predicted temperatures represent thermal conditions in both the accessible zones of the asset and the inaccessible zones of the asset.

12. The thermal monitoring system of claim 11, wherein the at least one processing device upon execution of the instructions is further configured to update an augmented reality visualization of the asset in real time using the corrected predicted temperatures, and wherein correcting the predicted temperatures comprises applying a correction formula that uses a difference between a predicted temperature for a prediction point and a currently received temperature for an essential monitoring point corresponding to the prediction point.

13. The thermal monitoring system of claim 11, wherein the at least one processing device upon execution of the instructions is further configured to:

determine whether a difference between the predicted temperatures for the subset of the prediction points and the currently received temperatures at the corresponding essential monitoring points exceeds a threshold; and cause an action to be performed that affects the asset in response to determining that the difference exceeds the threshold.

14. The thermal monitoring system of claim 11, wherein the time constants are associated with respective clusters of the simulation points, and wherein the at least one regression model is determined from the respective clusters of the simulation data.

15. The thermal monitoring system of claim 11, wherein the at least one regression model includes a steady-state regression model that uses polynomial regression and a transient-state regression model that uses exponential regression, and wherein predicting the temperature for the prediction points comprises:

predicting steady-state temperatures at the prediction points to generate predicted steady-state temperatures by applying the steady-state regression model; and predicting transient-state temperatures at the prediction points to generate predicted transient-state temperatures by applying the transient-state regression model using the predicted steady-state temperatures at the prediction points, the real time measured current, previously predicted transient-state temperatures for the prediction points, the time lapse, and the time constants, wherein the predicted temperature for the prediction points in real time includes the predicted transient-state temperatures.

16. The thermal monitoring system of claim 11, wherein the simulation includes two or more steady-state simulations using different simulation parameters, wherein the two or more steady-state simulations include a first steady-state simulation using a first simulation of at least two different electrical currents while the asset being simulated is at equilibrium, and wherein during the training phase, the at least one processing device upon execution of the instructions is further configured to repeat the steady-state loop process until the steady-state prediction is determined to be acceptable.

17. The thermal monitoring system of claim 16, wherein the steady-state loop process comprises:

extracting, for the two or more steady-state simulations, steady-state simulation points of the simulation points and a temperature associated with each of the steady-state simulation points;

applying, for each of the two or more steady-state simulations, a clustering algorithm to the extracted steady-state simulation points and their respective, associated temperatures to form a plurality of steady-state clusters;

applying a steady-state regression model to each of the steady-state clusters to represent a relationship between the temperatures associated with the respective steady-state simulation points and the simulation parameters;

generating the steady-state prediction by applying the steady-state regression model to selected simulation parameters for predicting steady-state temperatures of the steady-state simulation points at the selected simulation parameters;

determining a steady-state difference between the predicted steady-state temperatures of the steady-state simulation points and measured temperatures at a plurality of corresponding monitoring points of the asset, wherein the steady-state prediction is determined to be acceptable when the steady-state difference is below a steady-state threshold; and adjusting for use with a next repetition, if any, the selected simulation parameters to attempt to reduce the steady-state difference.

18. The thermal monitoring system of claim 11, wherein the simulation includes a transient-state simulation, and wherein during the training phase, the at least one processing device upon execution of the instructions is further configured to:

extract transient-state simulation points of the simulation points and temperatures associated with each of the transient-state simulation points for a plurality of spaced time steps;

apply a clustering algorithm to the extracted transient-state simulation points across the plurality of spaced time steps and their temperatures to form a plurality of transient-state clusters; and repeat a transient-state loop process until a transient-state prediction is determined to be acceptable.

19. The thermal monitoring system of claim 18, wherein the transient-state loop process comprises:

applying a transient-state regression model to each of the transient-state clusters using a most recent time constant associated with each of the transient-state clusters;

generating the transient-state prediction for predicting a latest temperature associated with respective transient-state clusters by applying the transient-state regression model using the steady-state prediction once it is determined to be acceptable, a previously predicted transient-state temperature for the respective transient-state clusters obtained at an earlier simulated time, an amount of simulated time elapsed since the earlier simulated time, and the most recent time constant for the corresponding transient-state cluster;

determining a transient-state difference between the predicted transient-state temperatures of the transient-state simulation points and the measured temperatures at the plurality of corresponding monitoring points of the asset, wherein the transient-state prediction is determined to be acceptable when the transient-state difference is below a transient-state threshold; and adjusting for use with a next repetition, if any, the time constant to attempt to reduce the transient-state difference.

20. A non-transitory computer readable medium comprising instructions executable by a processor to perform a method, the method comprising:

training, during a training phase, at least one regression model by applying machine learning to multi-dimensional simulation points of a simulation simulating an asset and temperatures associated with the respective simulation points;

repeating, during the training phase, a steady-state loop process until a steady-state prediction is determined to be acceptable, wherein the steady-state loop process comprises extracting, for the simulation, steady-state simulation points of the simulation points and a temperature associated with each of the steady-state simulation points;

receiving time constants and the at least one regression model determined during the training phase;

receiving real-time measured current used by the asset;

receiving real-time measured temperatures measured via sensors at essential monitoring points of the asset, wherein the essential monitoring points include thermally conductive surfaces of the asset on which the sensors are and/or locations at which discrete portions of the thermally conductive surfaces are within a field of view of the sensors;

predicting temperature for prediction points of the asset in real time to generate predicted temperatures by applying the at least one regression model and using the real-time measured current, previously predicted temperatures for the prediction points, a time lapse since the previously predicted temperatures were predicted, and the time constants, wherein the prediction points are selectable to include selected prediction points having same prediction points as the essential monitoring points and different prediction points than the essential monitoring points, wherein the same prediction points correspond to accessible zones of the asset that are accessible to the sensors, and wherein the different prediction points correspond to inaccessible zones of the asset that are inaccessible to the sensors;

performing a comparison of the predicted temperatures for a subset of the prediction points with currently received temperatures for the essential monitoring points that correspond to the subset of the prediction points;

correcting the predicted temperatures for the selected prediction points to generate corrected predicted temperatures using a result of the comparison; and outputting the corrected predicted temperatures in real time, wherein the corrected predicted temperatures represent thermal conditions in both the accessible zones of the asset and the inaccessible zones of the asset.

* * * * *